United States Patent [19]

Seymour

[11] Patent Number: 4,671,783

[45] Date of Patent: Jun. 9, 1987

[54] WHEEL AND CHAIN POWER TRANSMISSION MACHINE

[76] Inventor: Timothy H. Seymour, 335 Moran St., Biloxi, Miss. 39532

[21] Appl. No.: 671,403

[22] Filed: Nov. 14, 1984

[51] Int. Cl.$^4$ .............................................. F16H 7/06
[52] U.S. Cl. .................... 474/148; 474/156; 198/710
[58] Field of Search ............... 474/148, 156, 152, 49, 474/155; 198/710

[56] References Cited

U.S. PATENT DOCUMENTS

| | | | |
|---|---|---|---|
| 425,798 | 4/1890 | Hunt | 198/712 |
| 620,299 | 2/1899 | Frith | 198/706 |
| 683,603 | 10/1901 | Hunt et al. | 198/710 |
| 711,913 | 10/1902 | Sweetser | 198/710 |
| 1,904,068 | 4/1933 | Meacock | 474/156 |
| 2,931,486 | 4/1960 | Zebarth | 198/684 |
| 3,205,022 | 9/1965 | Greifendorff et al. | 474/163 X |
| 3,824,869 | 7/1974 | Murphy | 474/156 |
| 4,257,519 | 3/1981 | Leach | 474/153 X |

Primary Examiner—Stephen J. Novosad
Assistant Examiner—Thuy M. Bui

[57] ABSTRACT

This invention relates to a method for transmitting power to and from wheels via a train of links. The wheels have cam actuated members that effectively control the radial position of individual links as they enter, travel around, and exit the said wheels; thus, allowing for high operating speeds. The wheels also have cam manipulated members that transmit pwoer to and from the train of links such that the required engagement and disengagement of the said wheel and train of links occurs without relative slip greatly reducing wear and allowing for high operating speeds. An arrangement of links is disclosed that is especially suitable and complimentary to said wheels. Other devices are introduced that aid the said wheels and train of links as they work. These devices include: a method for guiding the train of links with respect to the centerline of the wheels, devices to control motions of the train of links, a guidance system to allow the train of links to go out of plane and return without adversely effecting operation, and a wheel arrangement that is very useful for the said transfer of power to the said train of links.

14 Claims, 18 Drawing Figures

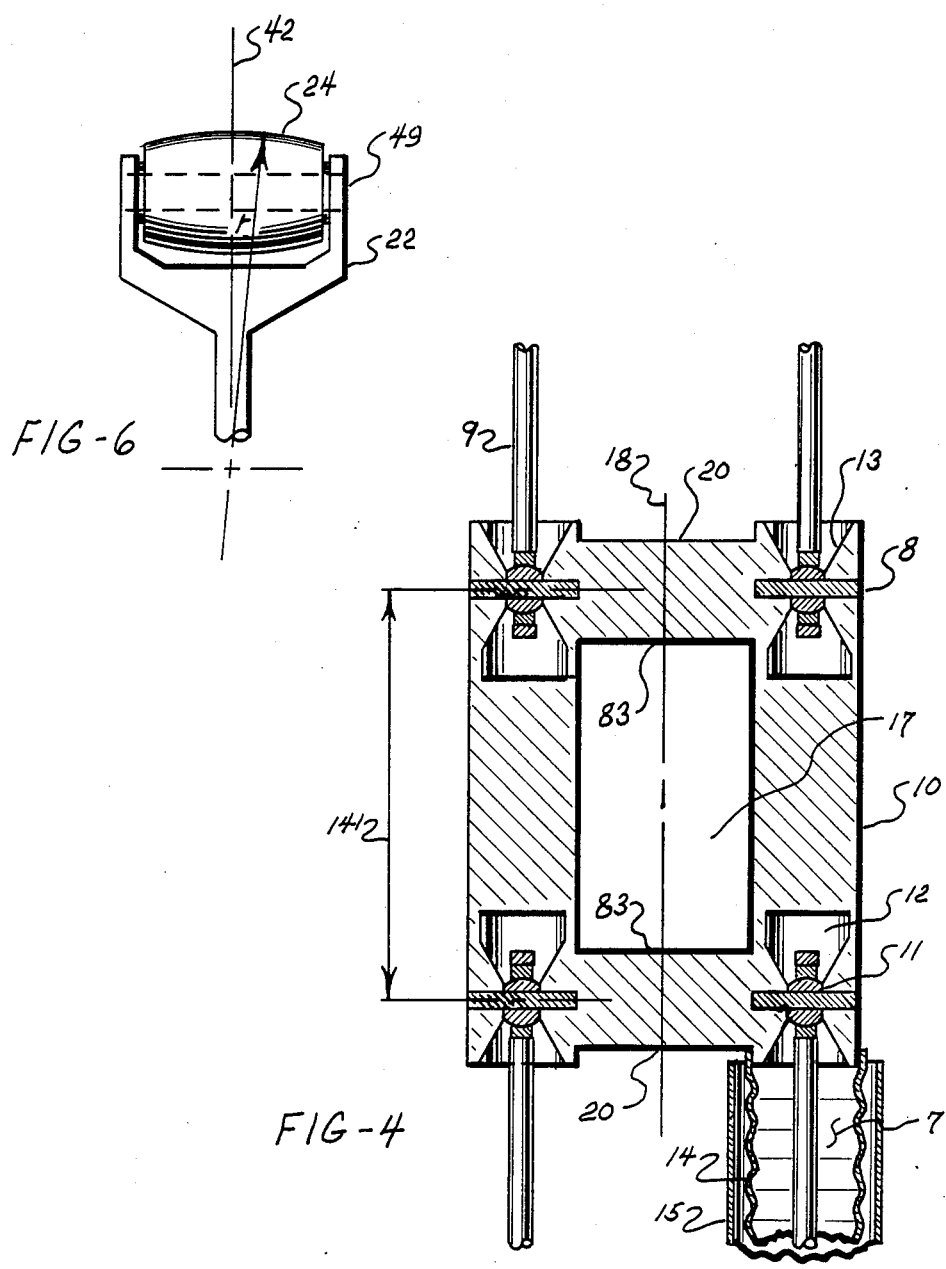

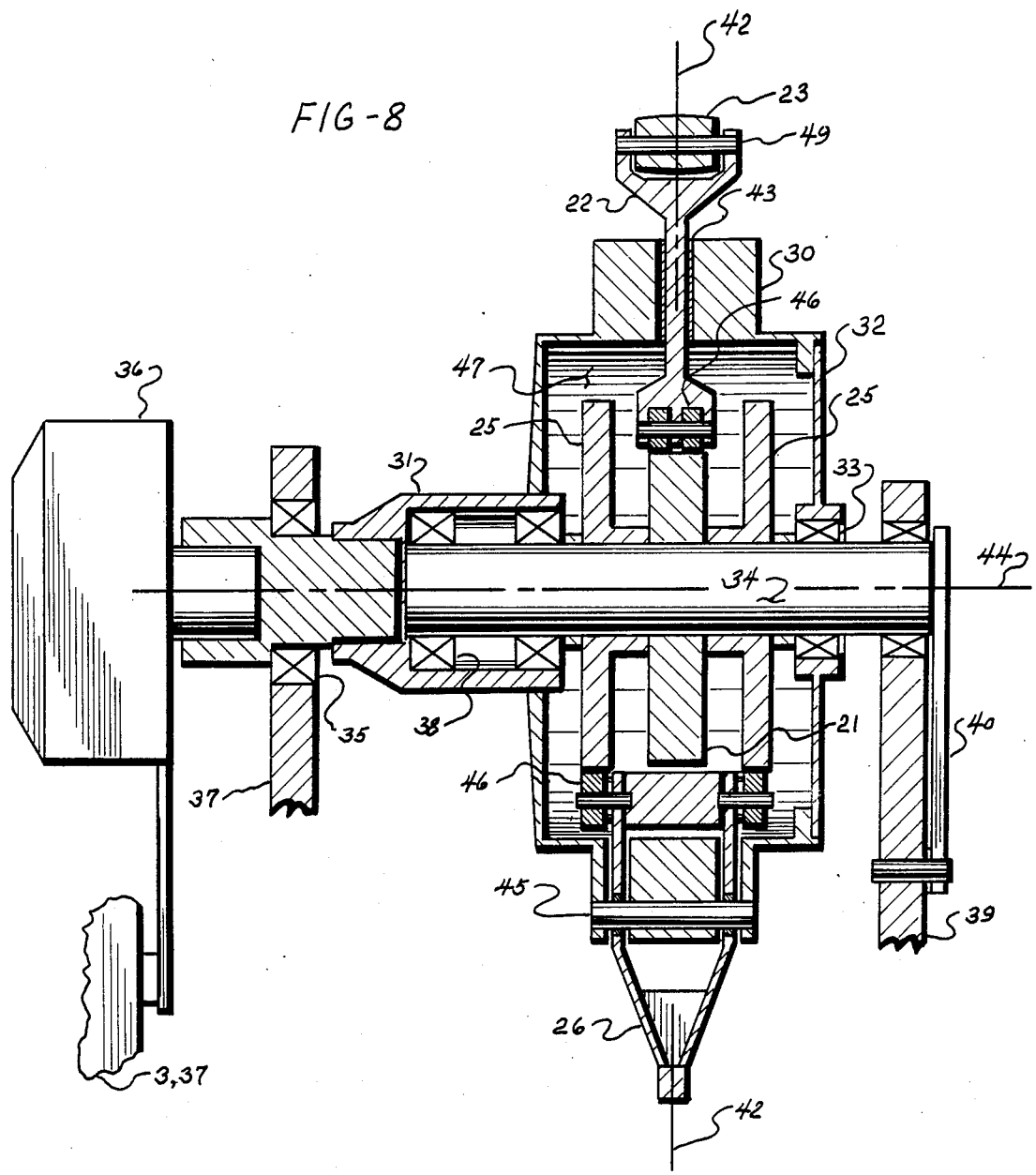

WHEEL AND CHAIN POWER TRANSMISSION MACHINE

SUMMARY OF THE INVENTION

In industry there frequently arises the need to transfer mechanical power from one place to another. Often this is accomplished by the use of wheels of one sort or another transferring power to or from a chain or belt. Sometimes the chain or belt is called upon to perform useful work such as conveying, digging, elevating, scraping, plowing, stacking, reclaiming, cutting, hauling, etc. When this is the case, the appropriate attachments required are connected to the chain or belt.

The most common means used to accomplish the above is either a train of links such as a roller chain supported and driven by gear tooth sprocket wheels or a belt made up of a flexible material such as rubber or leather which is supported and driven by pulleys.

The use of flexible belts made of rubber, leather, etc. is limited because of a number of reasons, some of which are: the low strength of the belt materials, slippage between the belt and its pulleys, pounding between the belt and its pulleys when the belt has attachments connected to it, monolithic construction which makes repairs and replacement difficult and expensive, etc.

The use of chains and sprockets is limited to lower and lower speeds as the size of the chains and sprockets increase. This is because the inherent pulsing and jerking motions imparted between the chain and the sprocket as they engage and disengage each other intensify as the pitch of the chain and sprocket is increased. This pulsing and jerking is a result of the inherent accelerations and decelerations in the velocity fo the chain with respect to the sprocket. With said slow speeds, the chain, sprocket, and attachments are usually impractical because of their required size and weight to perform the required work. (The said pulsing and jerking is a result of chordal action.

Chains and sprockets also wear themselves out because of the inherent slip between the chain and sprocket. This slip is due to the difference in chain and sprocket pitch which is required for easy engagement and the smooth transfer of forces from one sprocket tooth to another as each tooth takes its respective turn at transmitting power.

Chains and sprockets are also: noisy, prone to abnormal wear when they are exposed to dirty environmental conditions, hard to lubricate when the chain must work in dirty environments where lubricants mixed with dirt and/or other materials tend to increase wear, limited when handling products that can be contaminated by lubricants that migrate from the chain, i.e., foodstuffs, chemicals, etc.

Another limitation of chains, sprockets, flexible belts, etc. is their inability to operate when anything other than a slight lateral force is exerted upon the belt or chain. There is no accepted way to do this in industry today. In many cases this problem all but stiffles the use of chains, belts, etc. with attachments.

When the above discussed circumstances have existed, industry has had to use chains, sprockets, belts, etc. to their limit, often having to make do with the disadvantages of: increased weight, increased size, high maintenance cost and limited applications.

Various attempts have been made to develop a wheel that would handle a chain or train of links more effectively than a sprocket. These attempts generally have dealt with the two problems that are most evident in chains and sprockets; mainly, the chordal action due to the wheel giving radial support to the links, and the wear due to slip between the driving members and the links. Most of the attempts have focused on either one or the other of the problems with little or no attention given to the other. These attempts are mentioned below and grouped accordingly.

U.S. Pat. Nos. 425,798; 620,299; 683,603; 711,913; 2,931,486; and 3,824,869 incorporate the use of guide tracks to guide the train of links. Use of tracks removes the radial support function from a wheel, and thus chordal action. These patents focus on describing various methods of driving the train. The drive means discussed usually have a wheel with pivoting arms manipulated by cams. Said patents have evolved from driving the chain from along straight runs to corners where the motion of the pivoting arms on the wheel more nearly match the curvilinear motion of the links. It is noteable that when wheels are used this way, they are more of a gear than a wheel, since they only transmit power and do not give radial support.

U.S. Pat. No. 1,904,068 introduces a wheel that attempts to control chordal action with the use of guide tracks and cam actuated wheel members. The same members that are used to manipulate the links to prevent chordal action are also used to drive the train of links; therefore, this patent mixes together the function of supporting and transmitting power.

U.S. Pat. No. 3,205,022 introduced a wheel totally independent of guide tracks. This wheel also attempts to control chordal action with cam-actuated wheel members. This patent also mixes together the function of supporting and transmitting power.

U.S. Pat. No. 4,257,519 attempts to control the drive function without any regard to the polygon effect. Because of this neglect of chordal action, this method would, at best, be limited to very fine pitch chains and/or slow speeds. This patent would possibly fit in with the methods using external guides.

Of the above referenced patents, none have attempted to separate the drive and radial support functions into separate entities and incorporate them into one wheel which is independent of guide tracks. Without this separation, a wheel cannot control both the slip and chordal action totally; because, manipulation by the radial support cams is required at a different location on the wheel than the manipulation by the drive cams. Therefore, without independence, attempts to correct one problem will aggravate the other.

My invention, among other things, introduces a wheel to take the place of sprockets. It is different from the others referenced above mainly because it does separate the drive and support functions, without the use of guide tracks. My invention also introduces a very practical and simple geometry to control chordal actions. This geometry allows the chain or train of links to enter and exit a wheel very smoothly. My invention also introduces a new train of links, where use of said new train of links is made possible because of the utility of said wheel. My invention also discloses every component requried to assist the wheels and chain as they work, including a very practical wheel arrangement.

I believe all of the components described in this disclosure make up one complete invention, where all are more or less essential to the practical operation of a wheel and chain power transmission machine.

A principal objective of my invention is to introduce a wheel and chain power transmission machine that will handle a train of links at a high speed so that it will quickly and efficiently perform the required work while remaining practical in size and weight. This machine includes components to assist the chain and wheels.

Another principal objective of my invention is to introduce an new type of wheel, self-contained and lubricated, to replace the gear tooth sprocket wheel. This wheel will handle a chain, or other similar link devices made up of long pitches, efficiently and at high speed while remaining reasonably small in diameter.

Another principal objective of my invention is to introduce a new type of link device, where said link device is self-contained and lubricated and is especially adaptable to the above mentioned wheel. This link device will be able to work: quickly, quietly, and in all types of environmenal conditions without wearing itself out or contaminating the products which it is handling or working near. This device can be outfitted with attachments to perform all types of useful work such as: conveying, digging, elevating, scraping, plowing, stacking, reclaiming, cutting, hauling, etc.

Aonther objective of my invention is to introduce a line control device that is used to remove harmful vibrations or motions from the train of links.

Another objective of my invention is to introduce a wheel with crown rollers that will allow a twisted train of links to enter a wheel without detrimental pounding.

Another objective of my invention is to introduce a wheel with crown rollers that will track the train of links with respect to the centerlines of the wheels.

Another objective of my invention is to introduce a method of guidance that will allow the train of links to continue to work when acted upon by lateral forces. This guidance will allow the said train to go out of and return to its normal plane of operation.

Another objective of my invention is to introduce an arrangement of wheels that is compatible to the above mentioned method of guidance.

Another objective of my invention is to introduce an arrangement of wheels that is especially suited for allowing the transfer of power from the wheels to the chain when attachments are used.

Another objective of my invention is to introduce a counterweight method to protect the above mentioned wheel arrangement and train of links from damage due to contacting of surfaces adjacent to the train of links.

As mentioned, one of my objectives is to introduce a new type of arrangement of links. I have chosen to call this new train of links a mechanical belt. This term is used throughout this disclosure; however, it is not meant that it is the only type of link device or chain that the wheels and other components disclosed will handle.

DESCRIPTION OF THE VIEWS OF THE DRAWING

FIG. 4 is a sectional top view of a mechanical belt block.

FIG. 5 is a end view of a mechanical belt block.

FIG. 6 is a wheel centerline view of a crown support roller which shows the rollers curved profile.

FIG. 8 is a general sectional view of a wheel.

DETAILED DESCRIPTION OF THE INVENTION

Figure 1:
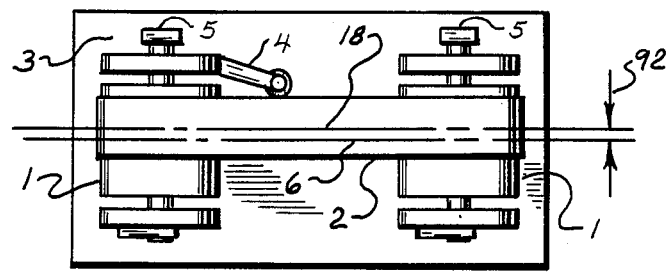
FIG. 1 is a general top view of the machine to be introduced. It is diagrammatic and shows the general relationship of the main components to each other.
Figure 2:
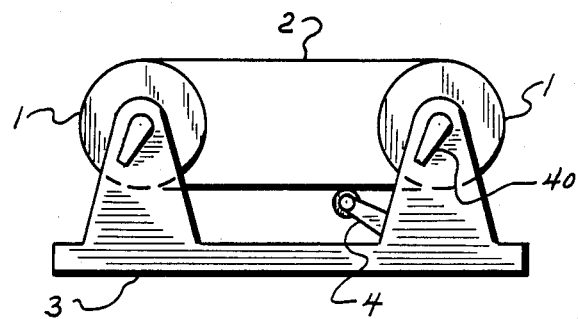
FIG. 2 is a general side view of the machine to be introduced. It is diagrammatic and shows the general relationship of the main components to each other.
Figure 3:
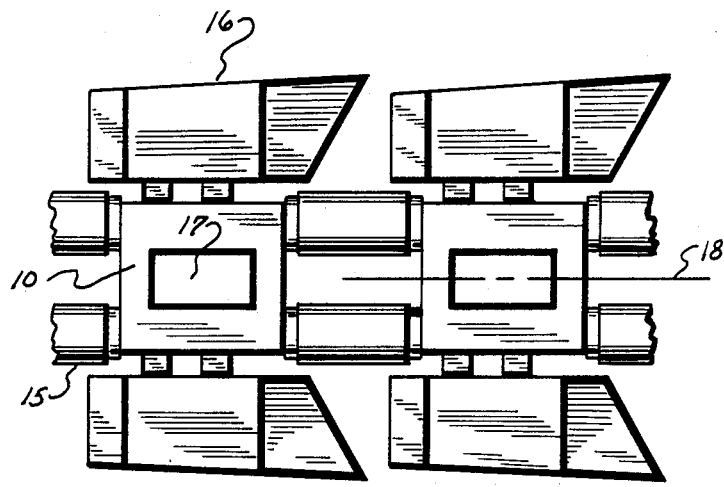
FIG. 3 is a top view of a portion of the mechanical belt.
Figure 3A:
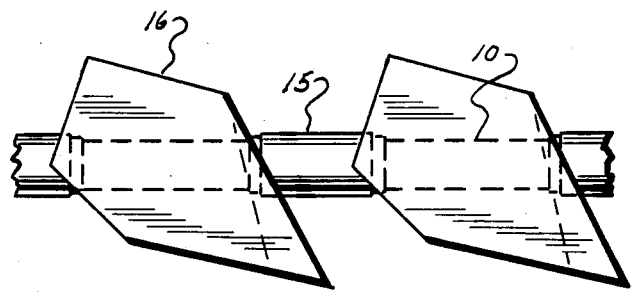
FIG. 3a is a side view of FIG. 3.
Figure 7:
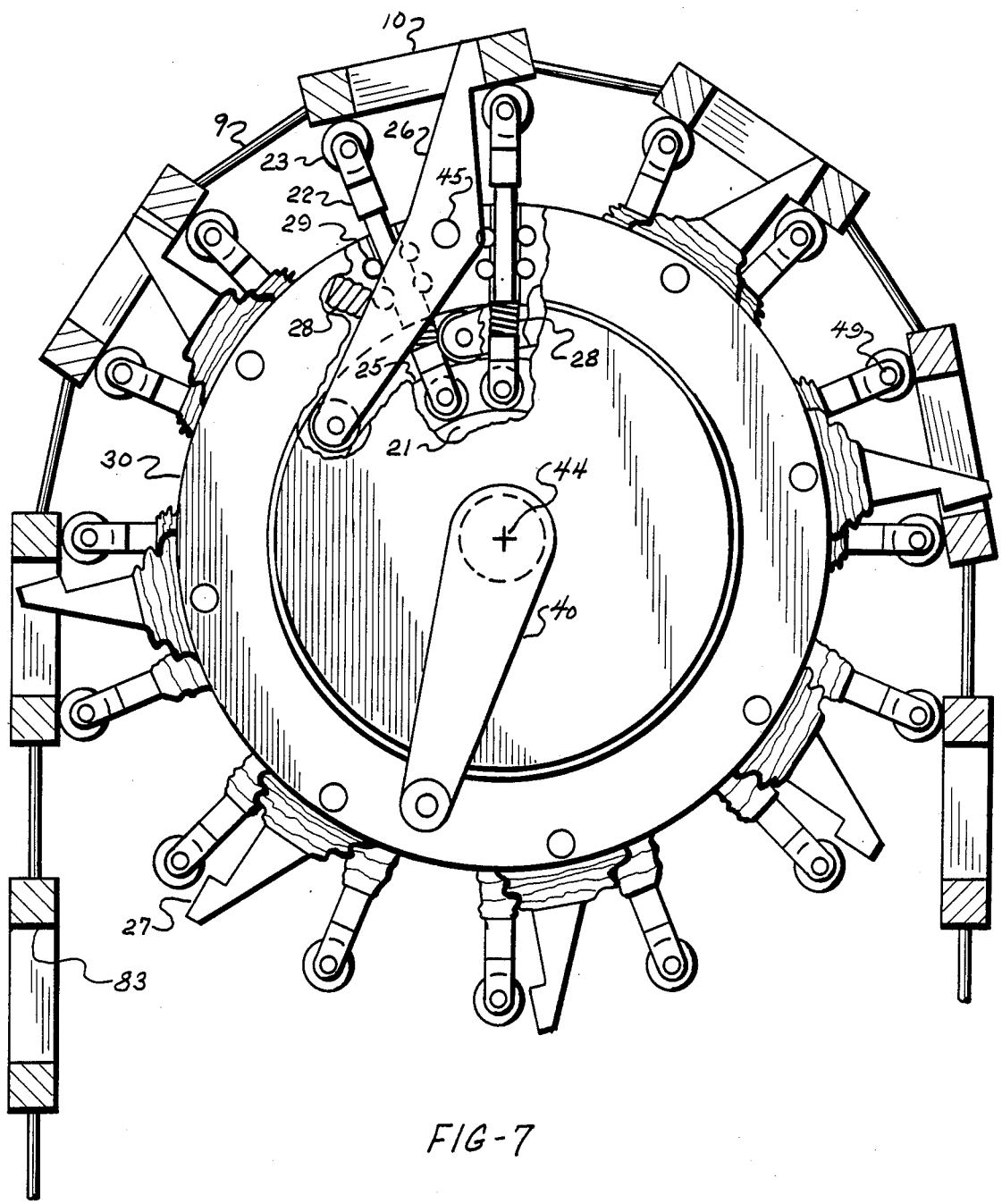
FIG. 7 is a general side view of a wheel and mechanical belt with portions removed.
Figure 10:
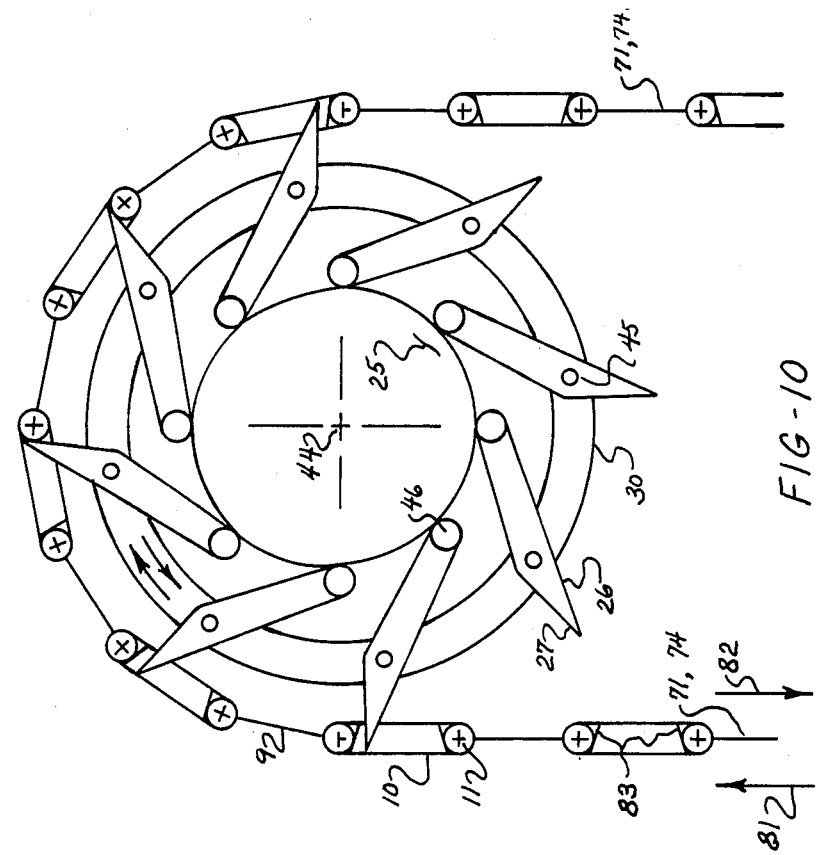
FIG. 10 is a diagram of a wheel's drive system.
Figure 9:
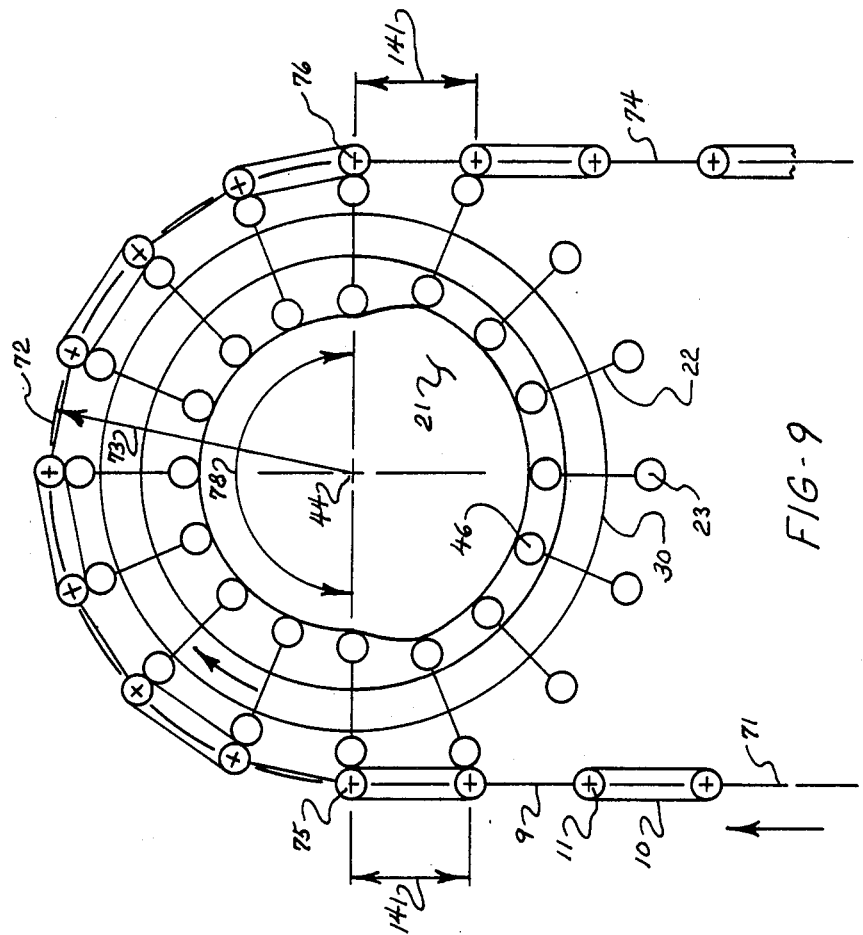
FIG. 9 is a diagram of a wheel's support system.
Figures 11, 12:
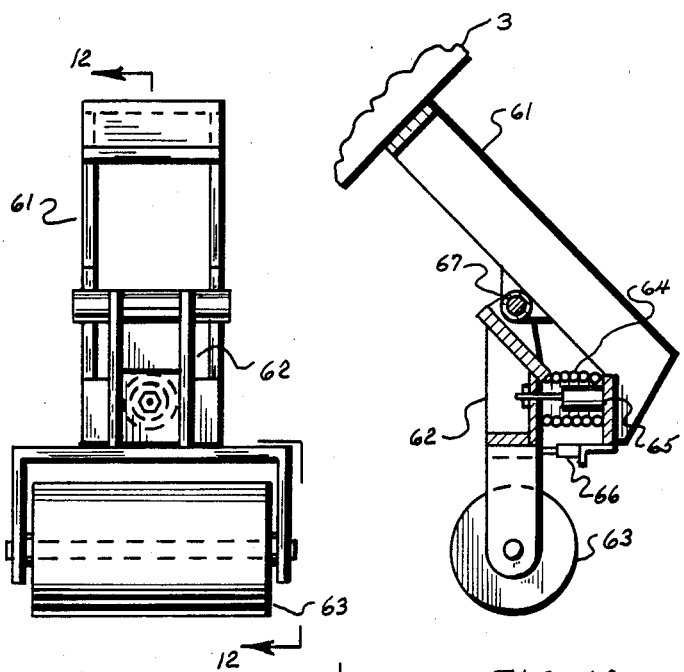
FIG. 11 is a view showing the general arrangement of parts that make up a control device.
FIG. 12 is a view taken along line 12 of FIG. 11.

Referring to FIGS. 1 and 2. The machine generally includes: a plurality of wheels 1 as required to direct, support and circulate a mechanical belt 2, where any or all of said wheels are equipped with motors and/or power take-off devices 5 for supplying power to and receiving power from the mechanical belt 2, any attachments that might be attached to the mechanical belt 2, control devices 4 which control the motion of the mechanical belt 2, and any supports 3 to hold the wheels 1 and control devices 4. The wheels 1 are arranged such that their centerlines (FIG. 8) are more or less located in a plane 6 which is more or less vertical to the ground. The said machine can be supported in any manner desired.

Referring more specifically to FIGS. 3, 3a, 4, and 5, the mechanical belt 2 is made up of a repeating arrangement to form a continuous train of similar components. The arrangement consists of a plurality of adjacent links 9 suitably connected 8 at each end to adjacent blocks 10 via a bearing 11. The block 10 acts as a housing 12 for the bearing 11. The inside of the housing 13 is shaped so that the link 9 will contact said inside 13 if tilted too far; thus, preventing damage due to too much flexibility. Pitch 141 is the distance from bearing 11 to bearing 11 down the length of the train of links; this is consistent with the pitch of roller chains, etc.

A flexible seal 14 surrounds the link 9 and is connected at each end to adjacent blocks 10. The flexible seal 14 together with the block 10 form an enclosure that protects the bearings 11 from foreign matter. The enclosure also holds a lubricant for the bearings 11. This type of protection and lubrication greatly lengthens the life of the bearings 11. When detrimental conditions exist, a sacrificial sleeve 15 surrounds the seal 14; this sleeve 15 sacrifices itself to wear while protecting the seal 14. The sleeve 15 is made so that it can be installed and removed without disassembly of the mechanical belt 2. The block 10 has a slot 17 cut in it to form internal drive surfaces 83. Any type of attachments can be connected anywhere to the block 10. Said attachments would include, but not be limited to, such things as: buckets, plows, scrapers, brooms, blades, etc. Attachments should be located so as not to interfere with the wheels 1. (A bucket 16 is shown for reference only, other attachments are not shown because of their common use by industry with chains, belts, etc.) The said arrangement is repeated until the desired length is obtained; then the ends are connected to form an endless train. The axis 19 of the mechanical belt 2 or block 10 is defined as a line that extends through the center of adjacent mechanical belt bearings 11 when looking at the end of a block 10. (The axis of a roller chain or other similar device would coincide with its pin or roller axis.) The centerline of the mechanical belt is represented by the line 18 centered between the bearings 11.

While the mechanical belt bearing 11 can be of any type, use of a spherical bearing compliments the said arrangement by not only allowing pivoting about the block axis 19, but also by allowing the mechanical belt 2 to twist, and to pivot transverse to the block axis 19. This arrangement sets the mechanial belt 2 apart from roller chains which are generally restricted to pivoting about the axis of their pins. This said arrangement also sets the mechanical belt apart from flexible belts which are generally restricted to bending about their weak axis and/or twisting about their centerline. This said arrangement also allows the mechanical belt 2 to store energy when it is twisted; this stored energy acts to restore the mechanical belt 2 to its untwisted position when the twisting force is removed. This said arrangement is desirable when crown support rollers 24 are used to shift the mechanical belt 2 from side to side with respect to the plane of the wheels 6 to compensate for misalignment of the mechanical belt 2 and/or to compensate for forces applied to the mechanical belt 2 as will be discussed later. This arrangement is also necessary when the mechanical belt is forced laterally from the plane of the wheels 6 as will be discussed later. The ability to twist the mechanical belt 2 also allows for having built in twist in the belt 2 from wheel to wheel 1.

Referring more specifically to FIGS. 6,7,8,9 and 10, the wheel 1 is comprised of two major systems, the support system and the drive system. These two said systems are generally independent of each other. The support system is made up of a plurality of members which includes a fixed support cam or cams 21 and support cam followers 22. The support cam followers 22 have a support roller 23 attached their end that protrudes outward from the center of the said wheel. The support roller 23 can be shaped as a cylinder or it can be shaped with a curved profile, in the latter case said rollers are called crown support rollers 24. These support rollers 23 and/or 24 contact and give radial support to the mechanical belt 2 or similar train of links which is circulated by the wheels 1. The centerline of the crown support roller 24 or support roller 23 coincide with the centerline of the wheel 42. The drive system is made up of a plurality of members which includes a fixed drive cam or cams 25 and drive cam followers 26. The drive cam follower's drive face 27 are faced to contact and drive or be driven by the mechanical belt 2. In both systems, springs 28 are used to keep the cam followers 22 and 26 positively seated against the fixed cams 21 and 25. The cam followers of both systems have a cam roller 46 attached at their ends adjacent to the fixed cams to reduce friction. The cam followers 22 and 26 of both systems may are mounted to a rotating housing 30. The support cam followers 22 are attached to this housing 30 in such a way that they are free to move up and down radially with respect to the housing 30. Guide rollers 29 and/or plain bearings 43 maximize the efficiency of this up and down motion. The drive cam followers 26 are hinged 45 to the housing 30. Both of the cam followers 22 and 26 pass through slots cut through the interior of the housing 30. The housing 30 is connected at one end to a hub 31. The housing 30 is connected at the other end to a plate 32. The housing 30, hub 31, and plate 32 rotate concentrically about the rotational axis of the wheel 44. The hub 31 is attached to and receives or transmits power via a transmission, motor, brake, power take-off device, or other similar means 36.

The plate 32 is supported by a bearing 33 which is supported by a shaft 34. This said shaft 34 is fixed in place with respect to the rotation of the housing 30, etc. The hub 31 is supported by the motor or power take device 36 or by a bearing or bearings 35 supported by a pillow block 37 attached to or part of the system's support structure 3. The shaft 34 is supported on one end by bearings 38 which are mounted inside of the hub 31, these bearings 38 allow the hub 31 to revolve with respect to this shaft 34 while keeping the axis of rotation of the hub 31 and the longitudinal axis of the shaft 34 in line, this arrangement allows for: the inline connection of the said motor or power take-off device's output shaft to the hub 31 and a reduction in the diameter of the shaft 34. The longitudinal axis of the shaft 34 coincides with the rotational axis of the wheel 44. The shaft 34 is supported at the end opposite the hub 31 by a pillow block 39 attached to or port of the system's support structure 3. To keep the shaft 34 from turning, it is fastened by a torque arm 40 or other similar device to the system's support structure 3. The support cam or cams 21 and the drive cam or cams 25 are fixed to and supported by the shaft 34.

The hub 31, housing 30, and plate 32 are equipped with appropriate sealing devices so as to form an enclosure 47 to exclude foreign matter from and/or to hold a lubricant for the wheel's internal moving members. These said members include the support cam followers 22, drive cam followers 26, housing 30, guide rollers 29, bearings 33,35,38,43, etc. One type of seal 48 comprised of a flexible bellows or boot is shown at the location where the drive cam followers 26 and/or the support cam followers 22 protrude from the housing 30.

Referring more specifically to FIGS. 1, 2, 11 and 12, a control device 4 is used to control the motion of the mechanical belt 2 due to forces acting upon it. This motion can be in the form of vibrations and/or a moving from side to side of the mechanical belt 2 with respect to the plane of the wheels 6, etc. The control device 4 consists of a roller 63 mounted to the end of a hinged arm 62. The hinged arm 62 is hinged 67 to a frame 61 where said frame can be part of the support structure 3. A spring 64 connects the hinged arm 62 and the frame 61 together. A dampener 65 also connects the arm 62 and the frame 61 together. When required, a sensing-signaling device 66, such as a switch, is located so that it detects relative movement between the arm 62 and the frame 61.

The control device 4 is mounted anywhere adjacent to the mechanical belt 2 and/or its attachments as required. The frame 61 is mounted stationary to, or is part of, the supporting structure 3. The roller 63 is positioned adjacent to the mechanical belt 2 and/or its attachments. Whenever the mechanical belt 2 and/or its attachments contact the roller 63, it will turn thus preventing snagging and wear of the mechanical belt 2 and/or its attachments. The roller 63 can be of any type of construction including a brush. When the roller 63 is contacted, it causes the arm 62 to swing about its hinge 67. This causes a relative motion between the arm 62 and the frame 61. This relative motion can be used to remove energy through the dampener 65. The spring 64 is used to keep the roller 63 in its desired position adjacent to the mechanical belt 2. The sensing-signalling device 66 is used to send a signal to any controls or motors that would be required for additional assistance in controlling the motion. The sensing-signaling device 66 is not necessary if additional assistance is not required.

A description of the operation of the wheels 1 and the mechanial belt 2 is now put forth. The block 10 is the only part of the mechanical belt 2 assembly that comes into contact with the wheel's drive or support systems. The drive cam follower's exposed face 27 contacts and transmits power to and from the ends 20 of the block 10 adjacent to the flexible seals 14 or to the interior ends 83 of the slot 17. The support cam rollers 23 and/or crown support rollers 24 contact the top and/or bottom of the block 10 to give radial support and manipulate the path of the mechanical belt's 2 bearings 11. Each support cam follower 22 is assigned one specific set of bearings 11 to manipulate as the bearings 11 enter, travel around, and exit the wheel 1. (A set of bearings is defined as those bearings 11 adjacent and located on the same block axis 19.)

The support roller system (FIG. 9) is the key to the smooth and fast operation of the wheel 1 and the mechanical belt 2. Said system controls the above mentioned chordal action. As the mechanical belt 2 and wheel 1 rotate about the rotational axis of the wheel 44, this system supports the mechanical belt 2 and controls its radial position by way of the support cam followers 22. As they rotate about the wheel 1 via the rotating housing 30, the support cam followers 22 are manipulated radially up and down by the fixed support cam or cams 21. This manipulation is such that the mechanical belt's bearings 11 more or less follow a path which is: a straight or curved line 71 into the wheel 1, this line 71 being tangent to an arc 72 scribed by the desired path radius 73, around the wheel 1 on the arc 72, and exiting the wheel 1 on a more or less straight or curved line 74 which is tangent to the arc 72. The point where the entry line 71 contacts the arc 72 is called the entry tangent point 75. The point where the exit line 74 contacts the arc 72 is called the exit tangent point 76. When entering a wheel 1, belt bearings 11 must be supported when they are at least one pitch length 141 from the entry tangent point 75. When exiting a wheel 1, belt bearings 11 must continue to be supported until they are at least one pitch length 141 from the exit tangent point 76.

By manipulating the bearings 11 to follow said path, the support system controls chordal action by keeping the magnitude of the velocity vector of the bearings 11 more or less constant as the bearings 11 enter, travel around, and exit the wheel 1; and by, keeping the direction of the velocity vector of the bearings 11: aimed in line or tangent with the path of the entry line 71 when entering the wheel 1, tangent to the path arc 72 around the wheel from entry to exit tangent points 75 and 76, and aimed in line or tangent with the direction of the exit line 74 when exiting the wheel.

The motion described results in the smooth operation of the wheel and the mechanical belt as the wheel changes the direction of the mechanical belt. This allows for higher speeds and long life of the wheels 1 and the mechanical belt 2. (The above described path is the same path that a point located on the centerline of a flexible belt takes when traveling around a pulley.)

The angle created by extending lines from the tangent points 75 and 76 through the center of the wheel is the angle of wrap 78. The magnitude of the angle of wrap 78 corresponds to the amount of turn which the wheel 1 gives to the mechanical belt 2. The angle of wrap is varied accordingly.

The support roller 23 and/or 24 minimizes wear due to a slight relative motion between the support cam followers 22 and the mechanical belt block 10. This motion is a result of the support cam followers 22 manipulating the mecahnical belt's bearings 11 before they reach the entry tangent point 75, and after they pass the exit tangent point 76.

A wheel's drive system (FIG. 10) is used to transmit power to and from the mechanical belt 2, via the drive cam followers 26 and the rotating housing 30. When the said drive system is supplying power to the mechanical belt 2 the wheel 1 is driving. When the drive system is receiving power from the mechanical belt 2 the wheel 1 is being driven. In either case, the wheel 1 is constructed the same. However, the wheel 1 is positioned so that the drive cam follower's 26 exposed face 27 faces the direction of travel 81 of the mechanical belt 2 when the wheel 1 is driving, and positioned to face away from the direction of travel 82 of the mechanical belt 2 when the wheel 1 is being driven. Because of this particular positioning of the drive cam followers 26 with respect to their transmission of power, a brake 36 should be located on the wheels 1 to prevent overdriving. This brake or brakes absorbs the kinetic energy of the mechanical belt 2 and wheels 1 when decelerating. This brake is or can be part of the motor or power take-off devices 36 that are attached to the wheels 1.

The fixed drive cam or cams 25 manipulate the drive cam followers 26 as they revolve around the rotational axis of the wheel 44 so that they swing back and forth. This back and forth motion allows the position of the drive cam followers 26 to be such that the transmission of power to and from the mechanical belt 2 only takes place between entry and exit tangent points 75 and 76 of the wheel 1, where all points of the mechanical belt 2 and the drive cam followers 26 that are in contact have the same angular and tangential velocities. This prevents relative motions between the said contact points which would result in frictional wear.

This back and forth manipulation of the drive cam followers 26 also allows the transfer of driving forces from drive cam follower 26 to drive cam follower 26 to take place without acceleration and deceleration of the mecahnical belt. This is done by having the drive cams 25 swing a drive cam follower 26 up to gradually contact the mechanical belt 2 in such a way that when contact is made the drive cam follower 26 that had previously been contacting the mechanical belt is gradually swung away from the mechanical belt 2.

This back and forth manipulation of the drive cam followers 26 also allows for more than one drive cam follower 26 to transmit forces to and from the mechanical belt at one time, thus reducing the size of each individual drive cam follower 26.

Both the said support system and the said drive sytem of a wheel must be kept independent of each other if the two most serious problems (chordal action and wear due to slip) associated with circulating a chain or other train of links are to be more or less eliminated. It would be very difficult and impractical to get the unique motions required of both systems if they were integrated together; i.e., if they were integrated manipulation of one would cause manipulation of the other at a time when the other requires no manipulation. For example: most of the manipulations of the drive cam followers 26, as described above, come when the support cam followers 22 are causing the belt bearings 11 to travel around the path arc 72, at this time any manipulation of the support cam followers 22 would cause the bearings 11 to stray from this desired path.

The support system and the drive system, while independent of each other, are complimentary to each other. For example, the drive system could not transmit power to or from the mechanical belt 2, as discussed above-where there are no relative motions between said contact points, if the support system did not cause the mechanical belt to follow the path arc 72.

Figure 13:
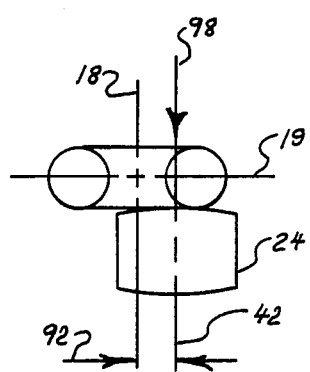
FIG. 13 is a diagram that will be used to explain the shift of the mechanical belt from side to side.
Figure 14:
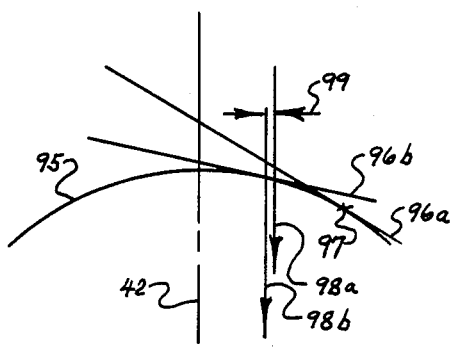
FIG. 14 is a diagram that will be used to explain how the crown rollers shift the mechanical belt from side to side.

Referring more specifically to FIGS. 6, 13, and 14, crown support rollers 24 are used to track the mechanical belt 2 with respect to a wheel's centerline 42 by inducing a twist and removing it as follows.

Whenever the line of action of the resultant radial force imposed by the mechanical belt 2 on a wheel does not pass through the wheel's centerline 42, a couple is created in the mechanical belt 2 with respect to the said centerline 42. Since a crown support roller 24 has a curved profile, it cannot resist the said couple; therefore, the block axis 19 will twist from its normal position (the normal position of the block axis 19 is perpendicular to the centerline of the wheel 42, where said centerline 42 coincides with the center of the said curved profile of the crown support roller 24). When this twist occurs, the crown support rollers 24 function in such a manner as to shift 92 the mechanical belt 2 over until the said line of action of the resultant radial force 98 once again passes through the centerline of the wheel 42, or until all of the twist is removed (reference FIG. 13). This said twist can be the result of the mechanical belt 2 being off center of the wheel, and/or the result of external forces acting upon the mechanical belt 2 outside of the plane of the wheel's centerline 42. Also, because of their curved profile, the crown support rollers 24 allow a twisted mechanical belt 2 to enter a wheel without detrimental pounding.

The said shifting action caused by the crown support rollers 24 can best be described with reference to the diagram of FIG. 14. The centerline of the wheel 42 is shown. A curved surface 95 is shown which represents the curved surface of a crown support roller 24. A line 96a is shown which represents a block's axis 19 entering the wheel 1 twisted. Because of this twist, the line 96a contacts the curved surface 95 at an initial contact point 97 which is outward from both the wheel's centerline 42 and the initial line of action 98a of the resultant radial force 98. The couple created by the said resultant radial force about the initial contact point 97 causes the line 96a representing the block's axis to rotate to a new position 96b as the block 10 enters the wheel 1. This rotation shifts the initial line of action of the resultant radial force 98a over an incremental amount 99 to a new position 98b, which also corresponds to a shift over of the block 10. In this way, the mechanical belt 2 is shifted over each time a block 10 enters a wheel until the line of action of the resultant radial force 98 once again passes through the wheel's centerline 42.

Line control devices 4 equipped with a sensing-signaling device 66 can be placed (reference FIGS. 1, 2, 11 and 12) adjacent to the mechanical belt 2 to monitor the amount of shift 92. Should the said shift exceed a certain amount, the sensing-signalling device 66 will send a signal to other means to aid in controlling the shift or to shut the machine down.

Figure 15:
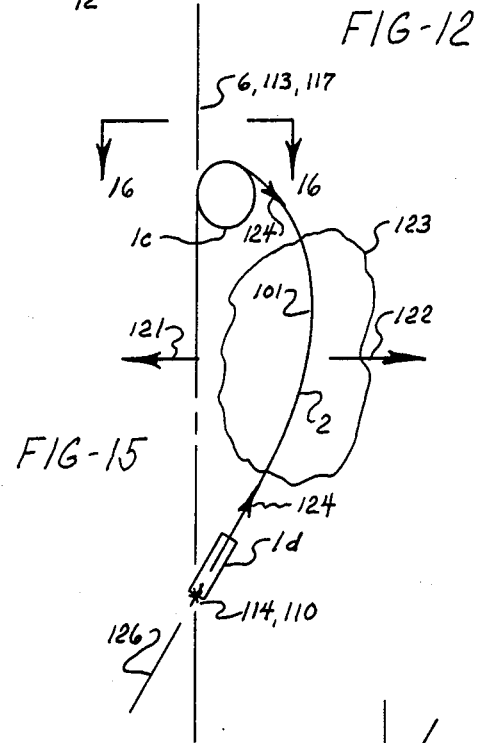
FIG. 15 is a diagrammatic view taken along line 15 of FIG. 17.
Figure 16:
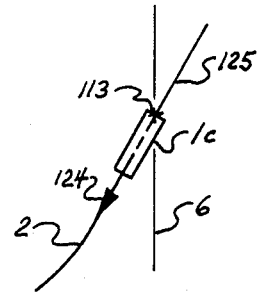
FIG. 16 is a diagrammatic view taken along line 16 of FIG. 15.
Figure 17:
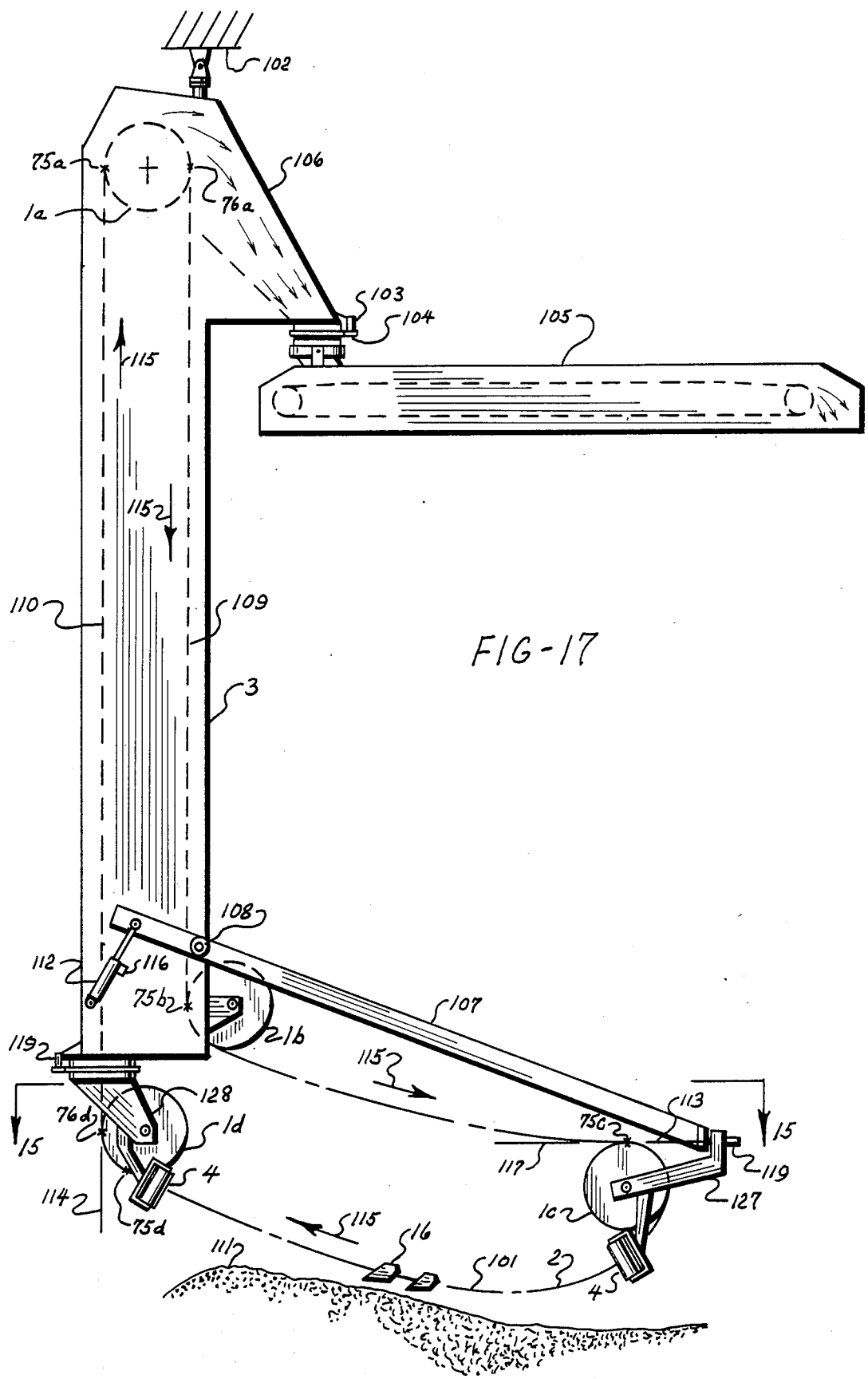
FIG. 17 illustrates an arrangement of wheels that is especially useful when attachments to the mechanical belt are to be used, it also shows an out-of-plane guidance system, and a counterweighted boom to prevent damage to the link device and wheels.

Referring more specifically to FIGS. 15, 16, and 17, the following description refers to a useful arrangement of wheels 1, where four wheels: 1a, 1b, 1c, and 1d are arranged so that they direct the mechanical belt 2 around in such a fashion as to form a loop 101. This loop 101 is advantageous when transmitting power to attachments that dig, scrape, plow, cut, etc. This said arrangement is also useful for reacting forces acting transversly on the mechanical belt 2 and/or its attachments with respect to the plane of the wheels 6; thus, preventing the mechanical belt 2 from being pulled off of the wheels 1. Other advantages of this arrangement will become clear in the following paragraphs. For illustration purposes, a machine that is ideally suited for transmitting power to bucket attachments which dig and elevate is shown in FIG. 17.

With special reference to FIG. 17, the wheel's support structure 3 can be carried or supported in any convenient manner by an overall support structure 102. The wheels 1 and the wheel's support structure 3 can be enclosed as required to prevent noise or dust pollution, etc. to the surrounding work area. The wheel's support structure 3 can be outfitted with a motor 103 and bearings 104 to rotate it and the wheels 1 with respect to the overall support structure 102. The wheel's support structure 3 can have conveyors 105, hoppers 106, or other means attached to aid in the work that the mechanical belt 2 and its attachments are performing. Said wheels are more or less arranged as such: wheel 1a is located above wheel 1b, a plumb line 109 dropped from the exit tangent point 76a of wheel 1a will contact the entry tangent point 75b of wheel 1b, The mechanical belt 2 more or less follows said line 109 from wheel 1a to wheel 1b. Wheel 1b directs the mechanical belt 2 more or less outward as shown to the entry tangent point 75c of exit wheel 1c. Exit wheel 1c directs the mechanical belt 2 more or less down into said loop 101. It is in this loop 101 that the attachments do the work that they are designed for. The mechanical belt 2 travels from the loop 101 more or less to the entry tangent point 75d of wheel 1d. Wheel 1d directs the mechanical belt 2 upward. The mechanical belt more or less follows a line upward to wheel 1a that coincides with a plumb line 110 dropped from the entry tangent point 75a of wheel 1a to the exit tangent point 76d of wheel 1d. The centerlines of the wheels 42 are generally located in the same plane which is the plane of the wheels 6. The direction of travel of the mechanical belt 2 is shown by arrow 115.

Should the said loop 101 contact a surface 111 more or less vertically below it and should this surface begin to support the mechanical belt 2, excessive slack will form in the loop 101. To prevent damage to the mechanical belt 2 and wheels 1 due to said excessive slack in the loop 101, wheel 1c is mounted to a vertically swingable boom 107 which is hinged 108 to the support structure 3. A counterweight means 112 is located at the end of the boom 107 opposite of wheel 1c. Should the mechanical belt contact a surface 111 as described, support of the mechanical belt 2 by the contacted surface 111 causes a decrease in the amount of support required by wheel 1c and the boom 107 to support the mechanical belt 2. This unbalances the counterweight 112 such that it will will swing said wheel 1c vertically upward, thus lifting the mechanical belt 2 off of the contacted surface 111 eliminating unwanted slack. A sensing-signaling device 116 can be incorporated to monitor the counterweight 112 and send a signal to other means to aid in controlling the situation should the swing up not solve the problem. (Excessive slack can cause: the mechanical belt to pile up on the contacted surface 111 causing detrimental stresses to the components that make up the mechanical belt assembly 2, the mechanical belt 2 to jump off of the wheels 1, the mechanical belt to whip, etc.)

Should the wheel support structure 3 rotate and/or be moved more or less laterally 121 relative to the mss 123 that the mechanical belt's attachments are working on or in, (reference FIGS. 15 and 16) the mechanical belt 2 will be forced outward laterally 122 with respect to the plane of the wheels 6 in the vicinity of the loop 101. The allow this to happen without detrimental effects, exit wheel 1c is mounted to a fairlead wheel support 127 which is hinge mounted to the boom 107 or support structure 3 in such a fashion that the hinge axis 113 more or less coincides with a line 117 tangent to the wheel 1c at its entry tangent point 75c. Also, entry wheel 1d is mounted to a fairlead wheel support 128 which is hinge mounted to the wheel's supporting structure 3 in such a fashion that the hinge axis 114 more or less coincides with line 110 which is tangent to wheel 1d at exit tangent point 76d. In both cases, the hinge axes 113 and 114 are located more or less in the plane of the wheels 6. Hinging of the wheels 1c and 1d as such allows the line of action of the resultant forces 124 created by the lateral movement 121, which act through the mechanical belt on the wheels, to more or less always pass through the centerlines of wheels 1c and 1d; thus, transverse forces 122 are reacted by the wheels 1c and 1d without detrimental results. The resulting twist in the mechanical belt due to the pivoting of wheels 1c and 1d about their hinge axis 113 and 114 is compensated for by the crown support rollers 24 and the said arrangement of the wheels. (When the wheels 1c and 1d are pivoted, their centerlines 125 and 126, respectively, do not lie in the plane of the wheels 6.)

To aid the pivoting of wheels 1c and 1d about their respective hinge axis 113 and 114, line control devices 4 equipped with sensing-signaling devices 66 are mounted to the fairlead wheel supports 127 and 128 adjacent to and on both sides of the mechanical belt 2 and/or its attachments. When the mechanical belt 2 is forced laterally 122, it bumps into these control devices 4. The sensing-signaling device 66 detects this and sends a signal to activate steering motors 119 which work to positively pivot the wheels 1c and 1d about their hinge axis 113 and 114. Each of said wheels is pivoted independently of the other. Pivoting will continue until the said bumping ceases.

I claim:

1. A wheel for circulating a chain made up of links, said links connected together by a hinging means, said wheel is partially comprised of a rotating housing with an attached means for transferring rotational energy, said rotating housing having a plurality of appendages where said appendages are divided into two separate groups, where each said group generally acts independent of the other said group, where the first said group acts to transmit power to and from said chain, where the second said group acts to provide radial support for said chain, where the said appendages of the second said group are supplied with a means for manipulation, wherein said manipulation controls the radial position of the said chain as it enters, travels around, and exits the said wheel.

2. A wheel according to claim 1, wherein said means for manipulating said appendages of said second group causes the center of pivoting of said hinging means of said chain to follow a special path, where said special path enters said wheel along a straight or curved line tangent to an arc, said arc swung from the center of rotation of said wheel, follows said arc around said center of rotation and exits said wheel along a straight or curved line tangent to said arc.

3. A wheel according to claim 2, wherein said appendages of said second group are manipulated so that they contact and provide radial support at least one pitch length from point of said tangency of said curved or straight line with said arc both upon entering and exiting said wheel.

4. A wheel according to claim 1, wherein said appendages of said second group have a roller attached to their end that protrudes outward from the center of said wheel, said roller contacting chain, whereby said roller reduces wear due to relative motions between the said chain and said appendages.

5. A wheel according to claim 4, wherein said roller has a crown profile, whereby said roller allows a twisted chain to enter and exit said wheel without pounding.

6. A wheel according to claim 4, wherein said roller has a crown profile, whereby said roller tracks the said chain laterally to keep said chain on said wheel.

7. A wheel according to claim 1, wherein each said appendages of said second group contacts said chain at or near one specific hinging means of said chain.

8. A wheel according to claim 1, wherein said wheel has a fixed shaft, where said fixed shaft is fixed from rotation with respect to said rotating housing, where said fixed shaft's longitudinal axis coincides with said wheel's center of rotation, where said fixed shaft is connected to said rotating housing by means that both supports one end of said fixed shaft and allows said rotating housing to revolve about said fixed shaft, whereby this allows for the inline mounting of said means for transferring rotational energy with the said longitudinal axis of said fixed shaft.

9. A wheel according to claim 1, wherein said wheels are equipped with a brake means, whereby said brake controls momentum of the said wheel and/or said chain.

10. A wheel for circulating a chain made up of links, said links connected together by a hinging means,
   wherein said wheel is partially comprised of a rotating housing with an attached means for transferring rotational energy,
   said rotating housing having a plurality of appendages attached,
   said appendages having a roller attached where said roller has a crowned profile,
   wherein said roller contacts and gives radial support to said chain.

11. A wheel for circulating a chain made up of links, said links connected together by a hinging means,
   said wheel partially comprised of a rotating housing with an attached means for transferring rotational energy,
   said rotating housing having a plurality of appendages attached with means for manipulating said appendages to reciprocate relative to said rotating housing, where said plurality of appendages are divided into two separate groups where each said group reciprocates independent of the other said group, whereby one said groups primary function is to contact and provide radial support to said chain, where the other said group's primary function is to contact and transfer rotational energy to/from said chain.

12. A wheel according to claim 11,
   wherein said means for manipulating said group of appendages for transferring rotational energy manipulates said appendages to contact said chain, whereby said manipulation causes said contact to take place only when the mutual points of said contact are traveling along an arc, where said arc is swung from the center of rotation of said wheel, whereby this eliminates relative motions between said points of contact.

13. A wheel according to claim 11,
   wherein said means for manipulating said group of appendages for transferring rotational energy manipulates said appendages to contact said chain, whereby said manipulation causes at least one said appendage to always be in contact with said chain, whereby this allows for the said transfer of rotational energy to/from said chain to take place without acceleration or deceleration of the said chain.

14. A wheel according to claim 11,
   wherein said means for manipulating said group of appendages for transferring rotational energy manipulates said appendages to contact said chain, whereby said manipulation causes more than one said appendage to be in contact said chain at any one time, whereby this allows for the said appendages in contact with said chain to share in the transferring of rotational energy thus allowing for said appendages to be of smaller proportions.

* * * * *